United States Patent
Le Thierry d'Ennequin et al.

(10) Patent No.: US 12,494,818 B2
(45) Date of Patent: Dec. 9, 2025

(54) ULTRA-WIDEBAND-ENABLED DEVICES AND SYSTEMS FOR FACILITATING ACCESS CONTROL

(71) Applicant: Qorvo US, Inc., Greensboro, NC (US)

(72) Inventors: Christophe Le Thierry d'Ennequin, Paris (FR); Guillaume Vivier, Paris (FR); Gabriele Perrone, Antibes (FR); Eric Perraud, Toulouse (FR)

(73) Assignee: Qorvo US, Inc., Greensboro, NC (US)

( * ) Notice: Subject to any disclaimer, the term of this patent is extended or adjusted under 35 U.S.C. 154(b) by 91 days.

(21) Appl. No.: 18/536,474

(22) Filed: Dec. 12, 2023

(65) Prior Publication Data
US 2024/0275429 A1    Aug. 15, 2024

Related U.S. Application Data

(60) Provisional application No. 63/484,425, filed on Feb. 10, 2023.

(51) Int. Cl.
*H04B 1/7163* (2011.01)
*G01S 3/14* (2006.01)
*G01S 13/08* (2006.01)

(52) U.S. Cl.
CPC .............. *H04B 1/7163* (2013.01); *G01S 3/14* (2013.01); *G01S 13/08* (2013.01); *H04B 2201/71634* (2013.01)

(58) Field of Classification Search
CPC ........ H04B 1/7163; H04B 2201/71634; G01S 3/14; G01S 13/08; G01S 2205/01; G01S 5/0284; G01S 13/765
See application file for complete search history.

(56) References Cited

U.S. PATENT DOCUMENTS

| | | | |
|---|---|---|---|
| 2007/0115950 A1* | 5/2007 | Karaoguz | H04W 88/08 370/356 |
| 2017/0055157 A1 | 2/2017 | Bergdale et al. | |
| 2018/0349653 A1* | 12/2018 | Al-kadi | G06Q 20/326 |
| 2021/0312424 A1 | 10/2021 | Lee et al. | |
| 2021/0383624 A1* | 12/2021 | Hoyer | G07C 9/22 |
| 2022/0335759 A1* | 10/2022 | Shin | G07C 9/28 |

(Continued)

OTHER PUBLICATIONS

M. Bieler, A. Skretting, P. Büdinger and T.-M. Grønli, "Survey of Automated Fare Collection Solutions in Public Transportation," in IEEE Transactions on Intelligent Transportation Systems, Sep. 2022, pp. 14248-14266, vol. 23, No. 9, doi: 10.1109/TITS.2022.3161606.

(Continued)

*Primary Examiner* — Omeed Alizada
(74) *Attorney, Agent, or Firm* — Haynes and Boone, LLP

(57) ABSTRACT

A method for operating an ultra-wideband (UWB) device includes detecting the UWB device entering an access-controlled area that includes a gate configured to perform a UWB communication, retrieving an access token from an application server of the access-controlled area through a wireless communication other than the UWB communication prior to the UWB device entering a predetermined range of the gate, and transmitting the access token to the gate through the UWB communication after the UWB device entering the predetermined range of the gate.

20 Claims, 10 Drawing Sheets

(56) References Cited

U.S. PATENT DOCUMENTS

2022/0398581 A1 12/2022 Jung et al.

OTHER PUBLICATIONS

U. B. Ceipidor et al., "Mobile ticketing with NFC management for transport companies. Problems and solutions," 2013 5th International Workshop on Near Field Communication (NFC), Mar. 2013, pp. 1-6, Zurich, Switzerland, doi: 10.1109/NFC.2013.6482446.

\* cited by examiner

ULTRA-WIDEBAND-ENABLED DEVICES AND SYSTEMS FOR FACILITATING ACCESS CONTROL

CROSS-REFERENCE TO RELATED APPLICATIONS

This application claims priority benefit of the filing date of U.S. Provisional Patent Application No. 63/484,425, filed on Feb. 10, 2023, the disclosure of which is herein incorporated by reference in its entirety.

FIELD OF THE DISCLOSURE

The present disclosure relates to ultra-wideband-enabled user devices and systems for facilitating access control, in particular, to wireless public transportation payment solutions that enables a seamless experience for users with a high throughput at access-controlled gates.

BACKGROUND

Today, wireless public transportation payment solutions typically rely on near field communication (NFC) technology for carrying out transactions, which requires the user to present a payment tool (e.g., an NFC card or an NFC-enabled device such as a smartphone) close to the access-controlled gate. NFC has a relatively short communication range, which enables a secure check-in and check-out process. However, a disadvantage of NFC is that user queues may form in front of the access-controlled gates.

In NFC-based systems, the user should be in close proximity of a reader in order to carry out a transaction. For example, in a transport station (or other access-controlled area) based on NFC, once the transaction is finalized, a command is sent to the gate controller, which causes a gate to open, and the user is allowed to pass through. Due to the limited communication range of around 10 cm, it is not possible to start the process before the user has reached the gate and provided his payment tool to the reader. Thus, in highly populated areas the system may become slow, and cause delays and formation of user queues.

Ultra-wideband (UWB) is a radio technology that is able to use a very low energy level for short-range, high-bandwidth communications over a large portion of the radio spectrum. UWB has traditional applications in non-cooperative radar imaging. Most recent applications target sensor data collection, precision locating and tracking applications. The range of communication of UWB is larger than NFC. Compared to NFC, using UWB may provide a seamless experience for users and consequently a higher flow of users, since users no more need to stop at the gates to retrieve their NFC cards or smartphones.

However, challenges still exist. For example, because there is no explicit interaction between users and access-controlled gates when using UWB, there needs to be a reliable way to determine unambiguously the actual user intent to go through the gates and to determine which gate to open. Further, the solution should work even when there is a high density of users, and users shall not have to stop at the gates waiting for the UWB transaction to be completed. Additionally, the gates need therefore to be able to determine in real time whether the user is allowed to cross the gates. As advancements in wireless public transportation payment solutions progress, the art continues to seek improved UWB-enabled access control systems and user devices capable of overcoming such challenges.

SUMMARY

Embodiments of the disclosure are directed to wireless public transportation payment solutions relying on UWB-enabled devices and access control systems. UWB-enabled devices may facilitate carrying out transactions, such as fare payments, because the UWB-enabled devices can be tracked with high accuracy and at the same time it can be used as a communication interface between the UWB-enabled devices and the readers of an access control system. The amount of radio resources utilization in the vicinity of the gate(s) is minimized by shifting the workload of fare transaction and access token retrieval prior to users arriving at the gates. In this regard, a very small amount of data needs to be exchanged over UWB in the vicinity of the gates, making UWB technology suitable for gate-access controlled systems.

In one aspect, a method for operating an ultra-wideband (UWB) device includes detecting the UWB device entering a access-controlled area that includes a gate configured to perform a UWB communication, retrieving an access token from an application server of the access-controlled area through a wireless communication other than the UWB communication prior to the UWB device entering a predetermined range of the gate, and transmitting the access token to the gate through the UWB communication after the UWB device entering the predetermined range of the gate. In certain embodiments, the method further includes retrieving a communication configuration from the application server of the access-controlled area. The communication configuration includes parameters for configuring the UWB communication and the wireless communication other than the UWB communication, respectively. In certain embodiments, the detecting the UWB device entering the access-controlled area is through a Global Positioning System (GPS) module of the UWB device. In certain embodiments, the detecting the UWB device entering the access-controlled area is through receiving a beacon signal from the access-controlled area. In certain embodiments, the access-controlled area is a access-controlled area. In certain embodiments, the method further includes monitoring location of the UWB device in the access-controlled area by communicating with a plurality of anchor devices located in the access-controlled area. The transmitting the access token is triggered by the monitored location being within the predetermined range of the gate. In certain embodiments, the plurality of anchor devices are UWB anchor devices. In certain embodiments, the retrieving the access token includes finalizing a financial transaction through the wireless communication other than the UWB communication. In certain embodiments, the transmitting the access token is through transmitting a One Way Ranging (OWR) message carrying the access token. In certain embodiments, the gate is configured to detect an angle of arrival (AoA) of the OWR message, and validate or ignore the access token based on the detected AoA. In certain embodiments, the transmitting the access token is through a Two Way Ranging (TWR) communication between the UWB device and the gate.

In another aspect, a method for operating an access control system having a gate configured to perform an ultra-wideband (UWB) communication includes acquiring information of arrival of a UWB device, sending communication configuration to the UWB device, which includes parameters for configuring the UWB communication and a wireless communication other than the UWB communication, sending an access token to the UWB device through the wireless communication other than the UWB communication, receiving by the gate the access token transmitted by the UWB device through the UWB communication, validating by the gate the access token, and opening the gate to pass through the UWB device. In certain embodiments, the method further includes tracking location of the UWB device through a plurality of anchor devices of the access control system. In certain embodiments, the sending the access token to the UWB device occurs during the UWB device is tracked by the plurality of anchor devices. In certain embodiments, the method further includes after the receiving of the access token, determining an angle of arrival (AoA) of a message carrying the access token. The validating the access token is triggered by the determined AoA. In certain embodiments, the method further includes after the receiving of the access token, evaluating a distance between the gate and the UWB device through a Two Way Ranging (TWR) communication. The validating the access token is triggered by the distance being less than a threshold. In certain embodiments, the access control system includes a first zone, a second zone, a third zone, and a fourth zone arranged in sequence. The first, second, third zones are on one side of the gate, and the fourth zone is on another side of the gate. The sending the communication configuration occurs in the first zone, the sending the access token occurs in the second zone, and the receiving the access token occurs in the third zone.

In another aspect, an ultra-wideband (UWB) device includes a transceiver operable to perform a UWB communication and a wireless communication other than the UWB communication, a memory for storing program instructions, a configuration of an access-controlled area, and an access token to access a gate of the access-controlled area, and a processor coupled to the transceiver and to the memory. The processor is operable to execute the program instructions, which, when executed by the processor, cause the UWB device to perform the following to facilitate hands-free fare validation when a user carrying the UWB device enters the access-controlled area: receive the configuration of the access-controlled area, receive the access token from an application server of the access-controlled area through the wireless communication other than the UWB communication, and based on a location tracked by a plurality of anchor devices in the access-controlled area, transmit the access token to the gate of the access-controlled area through the UWB communication. Parameters of the UWB communication are configured by the received configuration of the access-controlled area. In certain embodiments, the wireless communication other than the UWB communication is one of Wi-Fi, Bluetooth, or cellular data. In certain embodiments, the memory is operable to store a pre-loaded access token prior to the user entering the access-controlled area, and the pre-loaded access token is converted to the access token by the application server of the access-controlled area.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description, serve to explain the principles of the disclosure.

Figure 7A:
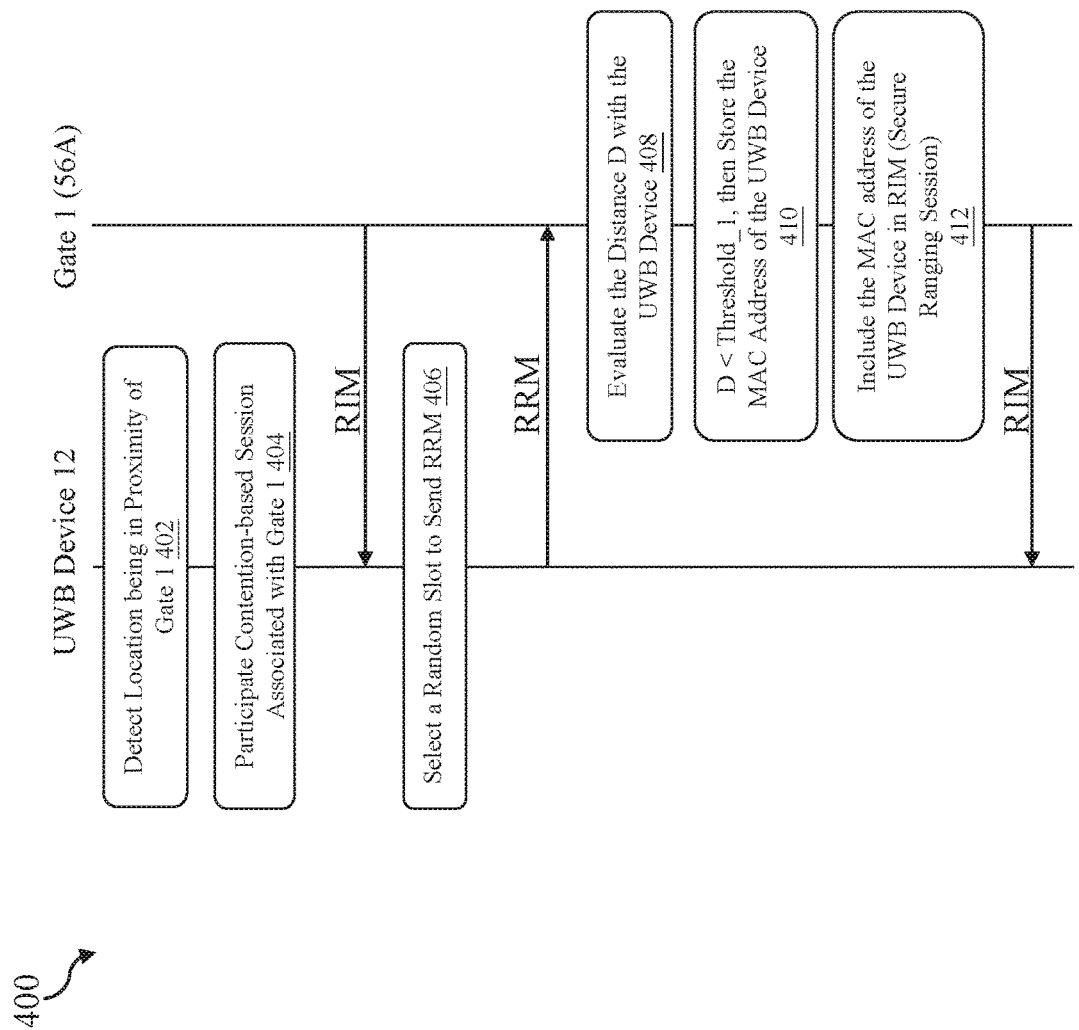
Figures 7B, 7C:
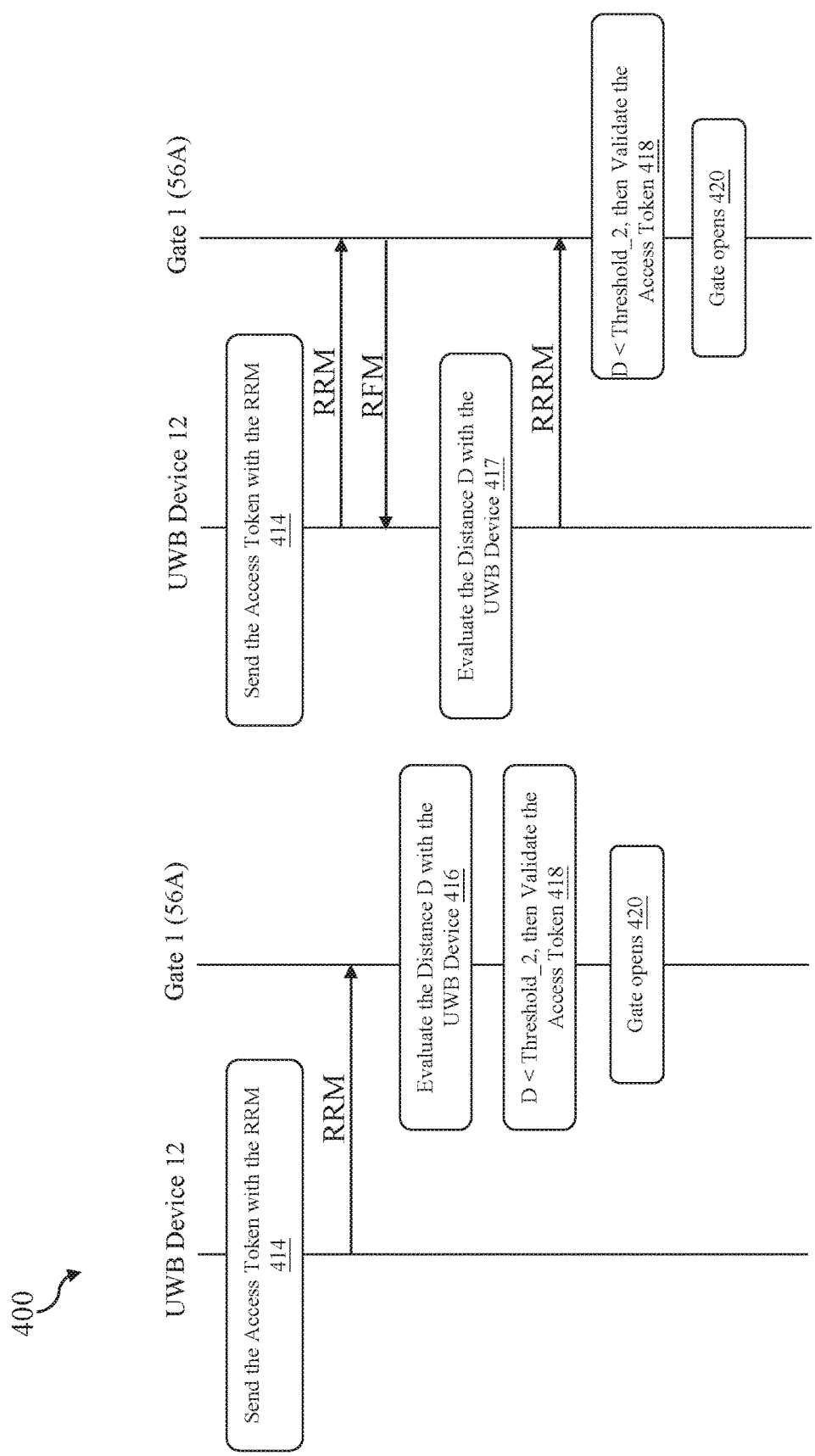

FIGS. 7A, 7B, and 7C illustrate signaling diagrams of secure ranging according to some aspects of the present disclosure.

Figure 8:
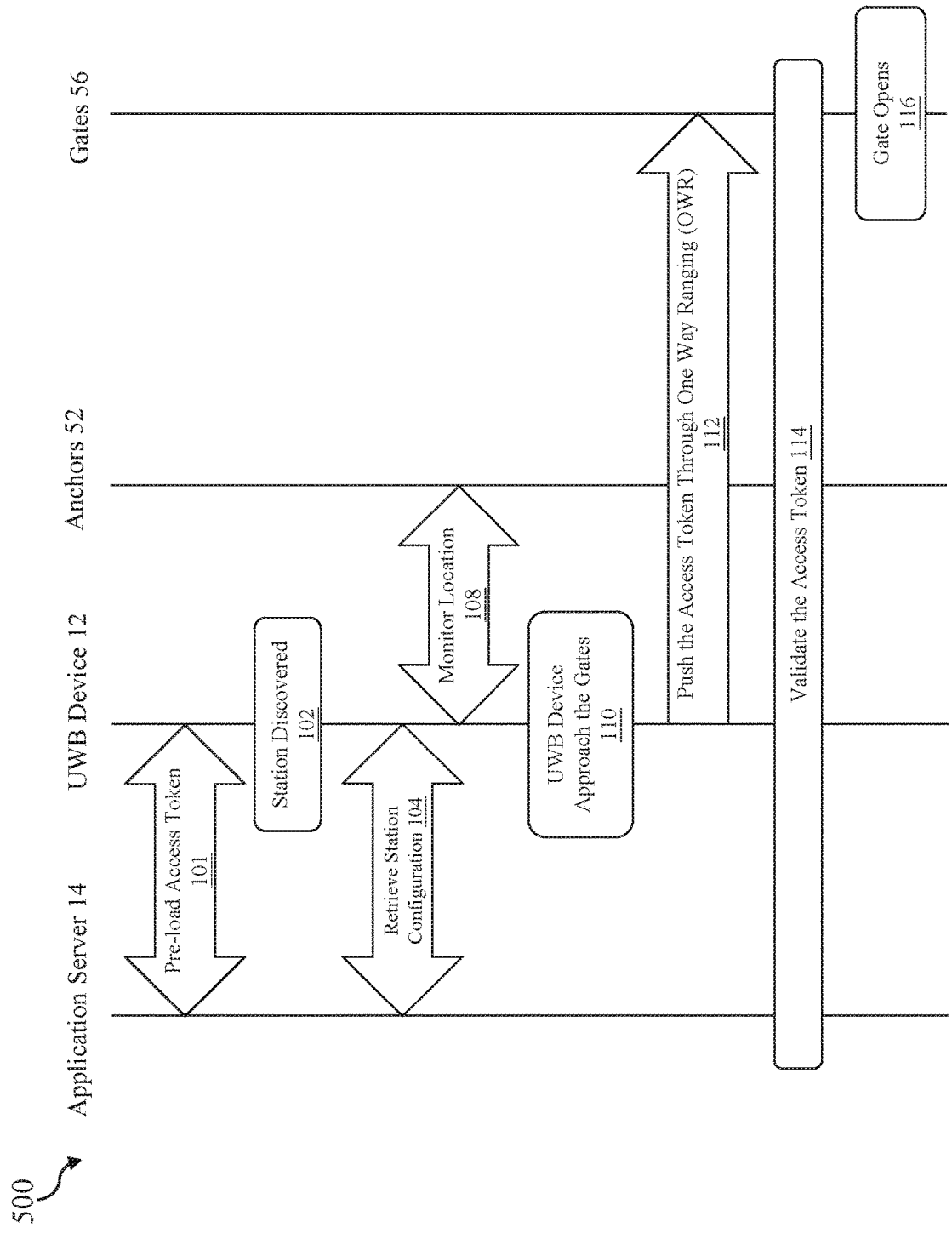

FIG. 8 illustrates a signaling diagram when an access token is preloaded in advance within a UWB device prior to entering a transport station according to some aspects of the present disclosure.

Figure 9:
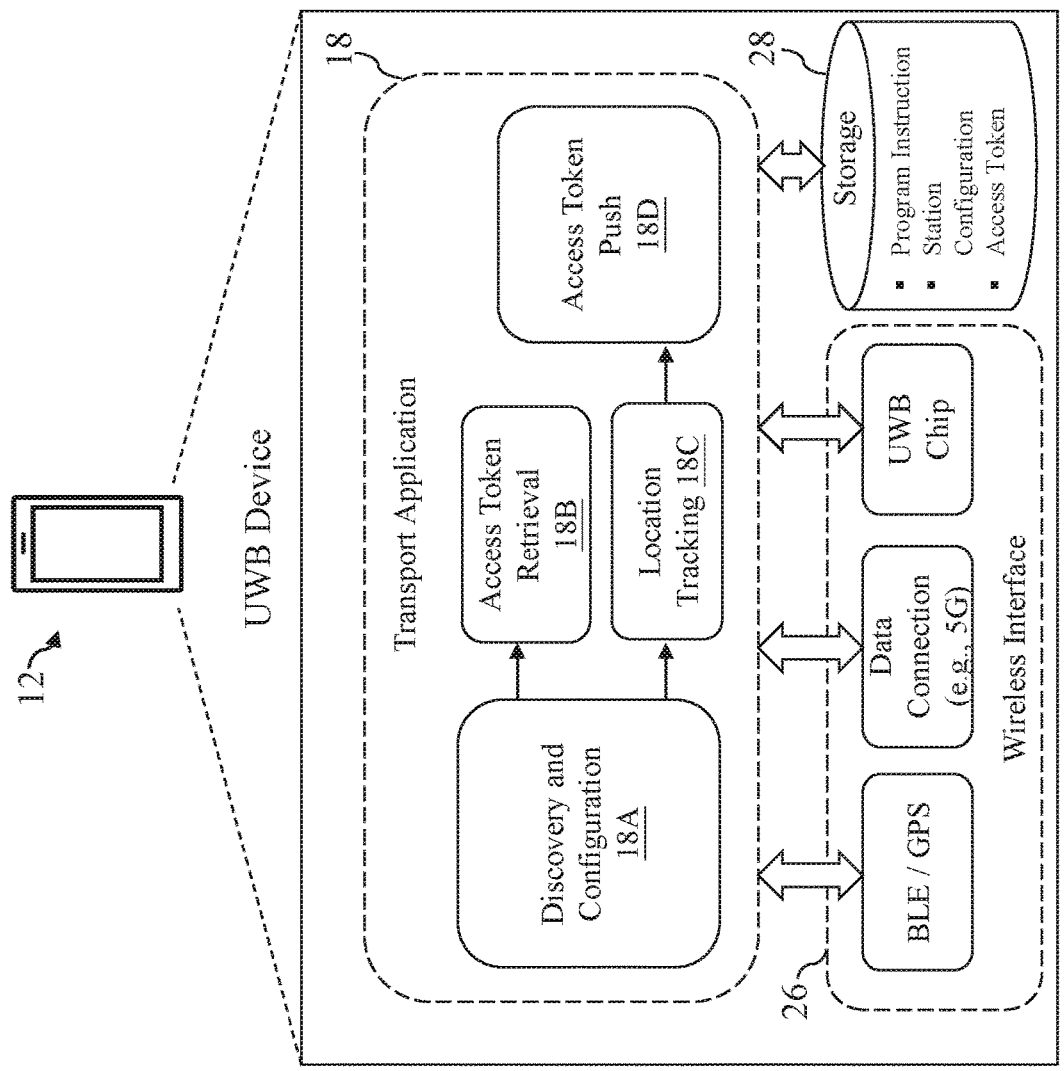

FIG. 9 illustrates an exemplary UWB device architecture according to some aspects of the present disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein. Additionally, like reference numerals denote like features throughout specification and drawings.

It should be appreciated that the blocks in each signaling diagram or flowchart and combinations of the signaling diagrams or flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each signaling diagram or flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction for performing the functions described in connection with a block(s) in each signaling diagram or flowchart. Since the computer program instructions may be equipped in a computer or other programmable data processing devices, instructions that generate a process executed by a computer as a series of operational steps are performed by the computer or other programmable data processing devices and operate the computer or other programmable data processing devices may provide steps for executing the functions described in connection with a block(s) in each signaling diagram or flowchart.

Each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed substantially simultaneously or in a reverse order depending on corresponding functions.

Hereinafter, embodiments are described in detail with reference to the accompanying drawings. Further, although a communication system using ultra-wideband (UWB) is described in connection with embodiments, as an example, the embodiments may also apply to other communication systems with similar technical background or features. For example, a communication system using Bluetooth or ZigBee may be included therein. Further, embodiments may be modified in such a range as not to significantly depart from the scope of the present disclosure under the determination by one of ordinary skill in the art and such modifications may be applicable to other communication systems.

UWB may refer to a short-range high-rate wireless communication technology using a wide frequency band of several GHz or more, low spectral density, and short pulse width (e.g., 1 nsec to 4 nsec) in a baseband state. UWB may mean a band itself to which UWB communication is applied. UWB may enable secure and accurate ranging between devices. Thus, UWB enables relative position estimation based on the distance between two devices or accurate position estimation of a device based on the distance from fixed devices (whose positions are known, also referred to as anchor devices). The present disclosure assumes that the user is carrying a device capable of communicating through UWB (referred to as "UWB-enabled device" or simply as "UWB device").

Figure 1:
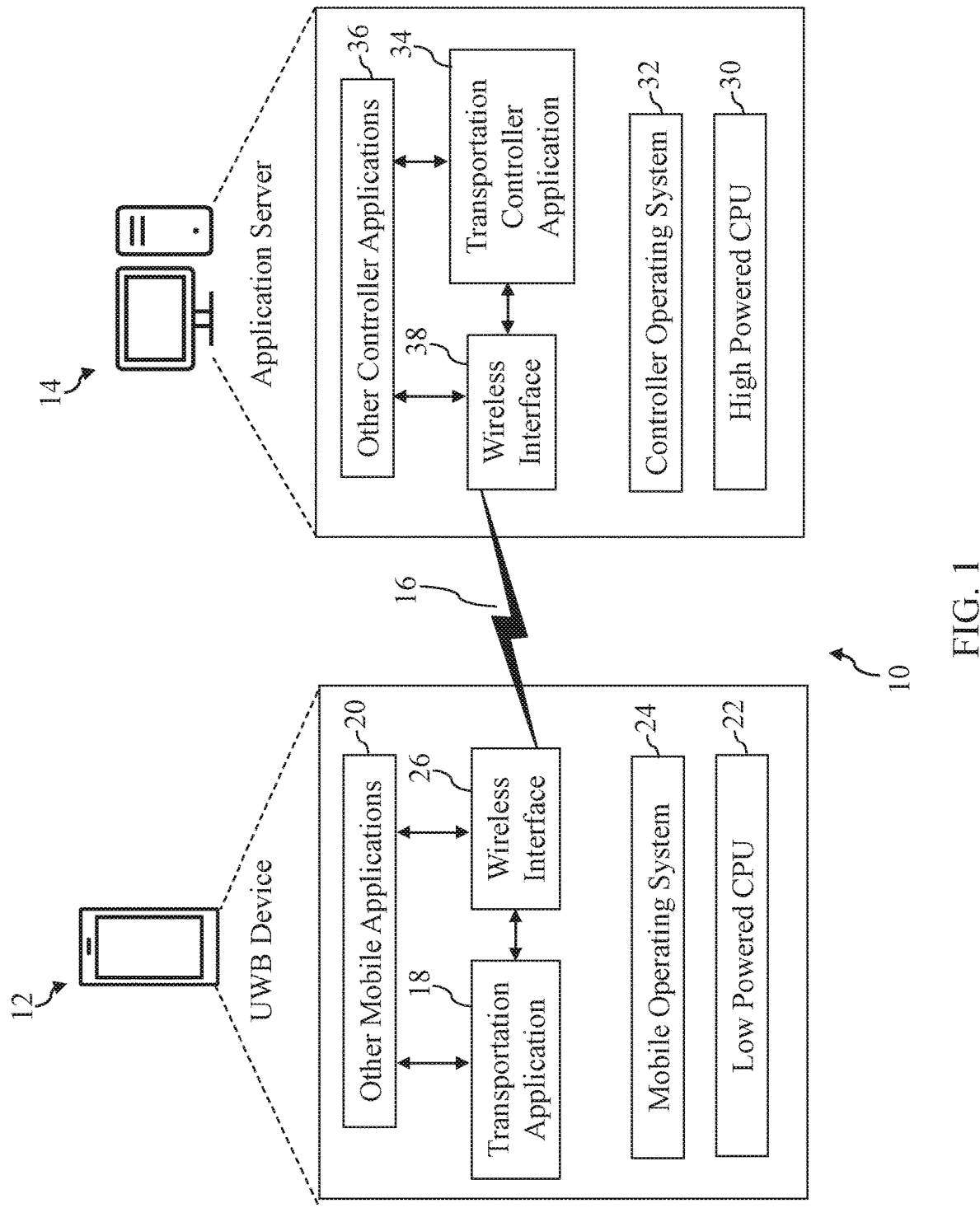
FIG. 1 illustrates an exemplary ultra-wideband (UWB) device and an exemplary access control system for implementing hands-free fare validation and seamless access control according to some aspects of the present disclosure.

FIG. 1 depicts an exemplary system 10 for implementing the wireless public transportation payment solutions according to one embodiment of the present disclosure. The system 10 may include a UWB device 12 that is in wireless communication with an application server 14, as symbolically illustrated by a wireless link 16. The UWB device 12 may be a mobile device. It is noted here that the terms "mobile device," "mobile handset," "wireless handset," and "User Equipment (UE)" may be used interchangeably hereinbelow to refer to a wireless communication device that is capable of voice and/or data communication. Some examples of such mobile handsets include smartphones, tablets, and wearable devices. It is observed here that, the application server 14 may not have to be a separate computing unit (in hardware or software form) dedicated to carry out the fare transaction and access token issuance functionality. In one embodiment, the functionality of the application server 14 may be implemented in an already-existing physical computing/data processing unit or (nonphysical) server software in a cloud. The wireless link 16 may include a UWB communication interface. The wireless link 16 may also support other types of wireless connections, such as a Bluetooth communication interface, a Wi-Fi communication interface, a cellular network connection (e.g., 4G, 5G) interface, a near field communication (NFC) interface, a ZigBee communication interface, or a combination thereof.

A transportation application 18 is one of the mobile applications installed in the UWB device 12. In addition to the transportation application 18, the UWB device 12 may also have one or more mobile applications 20 reside therein. These mobile applications 20 are software modules that may have been pre-packaged with the UWB device 12 or may have been downloaded by a user into the memory (not shown) of the UWB device 12. Some mobile applications 20 may be more user-interactive applications, whereas some other mobile applications, such as the transportation application 18, may be less user-interactive in nature. The mobile applications 20 as well as the transportation application 18 may be executed by the processor 22 under the control of the mobile operating system 24. Because of the battery-powered nature of mobile devices, the processor 22 may be designed to conserve battery power, such as a relatively low-powered Central Processing Unit (CPU). The UWB device 12 may further include a wireless interface unit 26 to facilitate wireless communication with the application server 14 via the wireless link 16. The applications 18, 20 may utilize the wireless interface 26 as needed.

The application server 14 is shown to include a relatively high-powered CPU 30 executing a controller operating system 32. In addition to the transportation controller application 34, the application server 14 may also store in its memory (not shown) other controller-specific applications 36 such as, for example, an application that facilitates Ethernet-based communication, an application that interacts with cloud, and the like. The application server 14 may wirelessly communicate with the UWB device 12 via its own wireless interface unit 38. The wireless interface units 26 and 38 may wirelessly transfer data or information between the UWB device 12 and the application server 14 using the wireless link 16 as shown.

Thus, in operation, a device-generated signal may be wirelessly sent (using the wireless interface 26) over the wireless link 16 to the application server 14 for further processing by its CPU 30. Any response or other signal from the application server 14 can be provided in the device-recognized wireless format by the access control unit's wireless interface 38 and eventually delivered to the device's wireless interface 26 (and, hence, to the device's processor 22 for further processing) via the wireless link 16. The resulting wireless "link" between the wireless interfaces 26 and 38 is symbolically illustrated by the bi-directional arrow 16. As discussed above, the wireless link 16 may represent a hybrid wireless communication approach that combines UWB communication and one or more wireless communications other than UWB (e.g., Bluetooth, Wi-Fi, and/or cellular data). As to be discussed in further detail below, the hands-free fare transaction and access token validation solution according to some aspects of the present disclosure may be implemented using the one or more wireless communications other than UWB to complete preparatory operations, such as "authentication", "fair transaction", and "access token issuance", prior to the user device arriving at the gate, and subsequently using UWB to push the retrieved access token to the gate for validation when the user device arrives at the gate, according to some aspects of the present disclosure. In this solution, a very small amount of data needs to be exchanged over UWB in the vicinity of the gates-simply an access token—as preparatory operations have been completed beforehand. As a result, the burden at the gates is alleviated, and the gates (or a gate controller) are able to quickly determine whether the user is allowed to go through. The risk of collisions among UWB messages transmitted by different users or gates may also be decreased.

Figure 2:
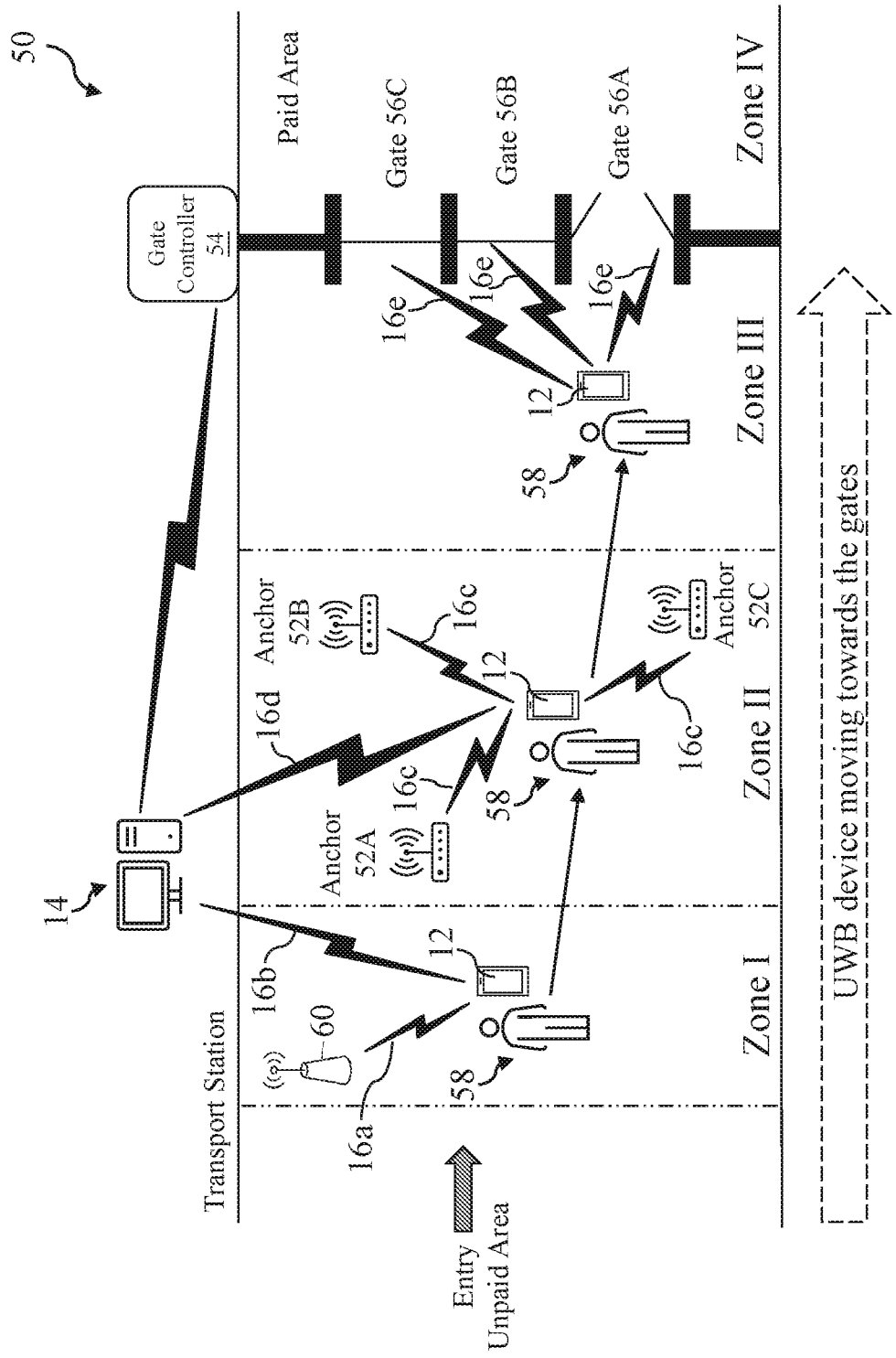
FIG. 2 illustrates an exemplary transport station with an access control system in which UWB technology is envisioned to be used to enable a user to seamlessly cross a gate according to some aspects of the present disclosure.

FIG. 2 shows an illustrative embodiment of a wireless public transportation payment solution that enables a seamless experience for users with a high throughput at access-controlled gates. Particularly, in the illustrative embodiment, an access control system 50 is implemented at a transport station (or other access-controlled area), such as a metro station. The access control system 50 includes an application server 14 coupled with a plurality of anchor devices 52A, 52B, 52C (collectively as anchors 52) and a gate controller 54. The gate controller 54 controls open and close status of a plurality of access-controlled gates 56A, 56B, 56C (collectively as gates 56). While only three anchors 52 are illustrated, the number of the anchors 52 may vary. Similarly, while only three gates 56 are illustrated, the number of the gates 56 may vary. The gates 56 may be turnstiles or another suitable type. Each gate 56 is equipped with at least one UWB antenna. Thus, the gate 56 is capable of performing a UWB communication. For example, each gate 56 may have two UWB antennas installed on two edges of a respective pass way leading to the gate. The details of the implementation of UWB antennas and the gates 56 will be further discussed below with respect to FIG. 5.

A user 58 who carries a UWB device 12 of the kind set forth may enter the transport station through an entry and approach one of the gates 56. It is noted that this UWB device 12 may be a smartphone, a tablet, or a wearable device. While the user 58 is moving towards the gates 56, operations of "authentication", "fair transaction", and "access token issuance" are performed in the background. In one or more embodiments, performing the operations set forth includes tracking the UWB device 12 within pre-defined zones around the gates 56. In this way, specific actions or operations may be associated with the different zones, which facilitates the execution of the transaction. In the example shown in FIG. 2, four different zones, namely the Zones I, II, III, IV, are defined for a check-in process. The Zones I, II, III are on one side of the gates 56, and the zone IV is on another side of the gates 56. The Zones I, II, III are part of an unpaid area of the transport station, and the Zone IV is part of a paid area of the transport station.

If the UWB device 12 is present in the Zone I, the UWB device 12 detects that it has entered a transport station. This step can be achieved by the UWB device 12 by monitoring its localization through any available method (e.g., using a GPS module or by detecting a beacon signal, such as a Bluetooth Low Energy (BLE) signal broadcasted by beacon device(s) installed within the transport station). For example, in FIG. 2, the UWB device 12 by receiving a Bluetooth beacon signal 16a from a beacon device 60 may determine that it enters the transport station. The beacon device 60 may be installed in proximity of entrance of the transport station. While the UWB device 12 is present in the Zone I, the UWB device 12 then retrieves the station configuration from the application server 14. The station configuration may include a map of the transport station, the position of the gates 56 within the station (for example their latitude and longitude, or their coordinates relative to a reference point), the position of the anchors 52, and/or other geographic information that may facilitate the user 58 to approach the gates 56. Additionally, the station configuration may include communication configuration that provides parameters necessary for the subsequent communication steps. The configuration parameters may include PHY and MAC parameters to be used for the establishment of a UWB session (for example, which UWB channel to use), the structure of a ranging block indicating which ranging rounds are dedicated to the anchors 52 and which ranging rounds are associated with each gate 56. The station configuration may be transmitted to the UWB device 12 through a wireless link 16b established based on Wi-Fi, Bluetooth, or cellular connection technology.

The UWB device 12 then monitors its location within the transport station by listening to the downlink time-difference-of-arrival (DL-TDoA) messages (e.g., Poll Downlink TDoA Message (DTM), Final DTM) sent by the anchors 52. The transport station may have at least three anchors 52 installed in the Zone II for implementing triangular positioning. The anchors 52 may be time synchronized. The DL-TDoA messages are transmitted through wireless links 16c established based on Wi-Fi, Bluetooth, or cellular connection technology. In one alternative embodiment, the anchors 52 are UWB anchors, and the wireless link 16c is established based on UWB communication.

While the user 58 approaches the gates 56, the preparatory operations "authentication", "fare transaction", and "access token issuance"—other than "access token validation" which is performed at the gates through UWB—are performed in the background. Those preparatory operations may be performed by the UWB device 12 by communicating with the application server 14 through wireless link 16d. The wireless link 16d may be any radio access technology available within the station. Particularly, the wireless link 16d may be established based on a wireless communication other than UWB communication, such as Wi-Fi, Bluetooth, or cellular connection technology. Alternatively, the wireless link 16d may be based on UWB communication. Once those preparatory operations are completed, the user obtains an access token from the application server 14 through the wireless link 16d. In one example, once authentication and fare transaction are completed, an encrypted access token valid for a limited time period is provided to the UWB device 12 by the application server 14. The UWB device 12 may receive the access token while still within the Zone II. In one example, the preparatory operations may be performed in any context where a connection (e.g., Wi-Fi or cellular data) is available shortly before crossing the gate (e.g., within one minute). The preparatory operations are not time constrained, since this critical part of the transaction is not performed when the user is at the gates. It can therefore be based on more secure and/or complex methods.

Once the UWB device 12 detects that its location is within a distance threshold (e.g., a few meters) from one or several gates, the UWB device 12 determines it enters the Zone III and starts providing the access token to the gates 56 through wireless links 16c. The wireless links 16e are based on UWB communication. UWB antennas are deployed at the gates 56, in order to communicate with the UWB device 12. The transmission of the encrypted access token over UWB may be performed for example using UWB One Way Ranging (OWR), or UWB Secure Ranging (SR). The gates 56 (or the gate controller 54) determines which gate is the proper gate (e.g., gate 56A in FIG. 2) to open based on the UWB communication with the UWB device 12. Once the proper gate 56 (or the gate controller 54) validates the access token, it allows the user 58 to go through the proper gate into the Zone IV, such that the user 58 enters the paid area.

Since the time and radio resources demanding operations of authentication and fare transaction are already done prior to the user 58 entering the Zone III, the amount of data exchanged over UWB at the gates is significantly reduced as only an access token is transmitted over UWB. As a result, the risk of collisions among messages sent by different users at the gates is decreased, and the overall throughput of person per unit time per gate can be increased.

Figure 3:
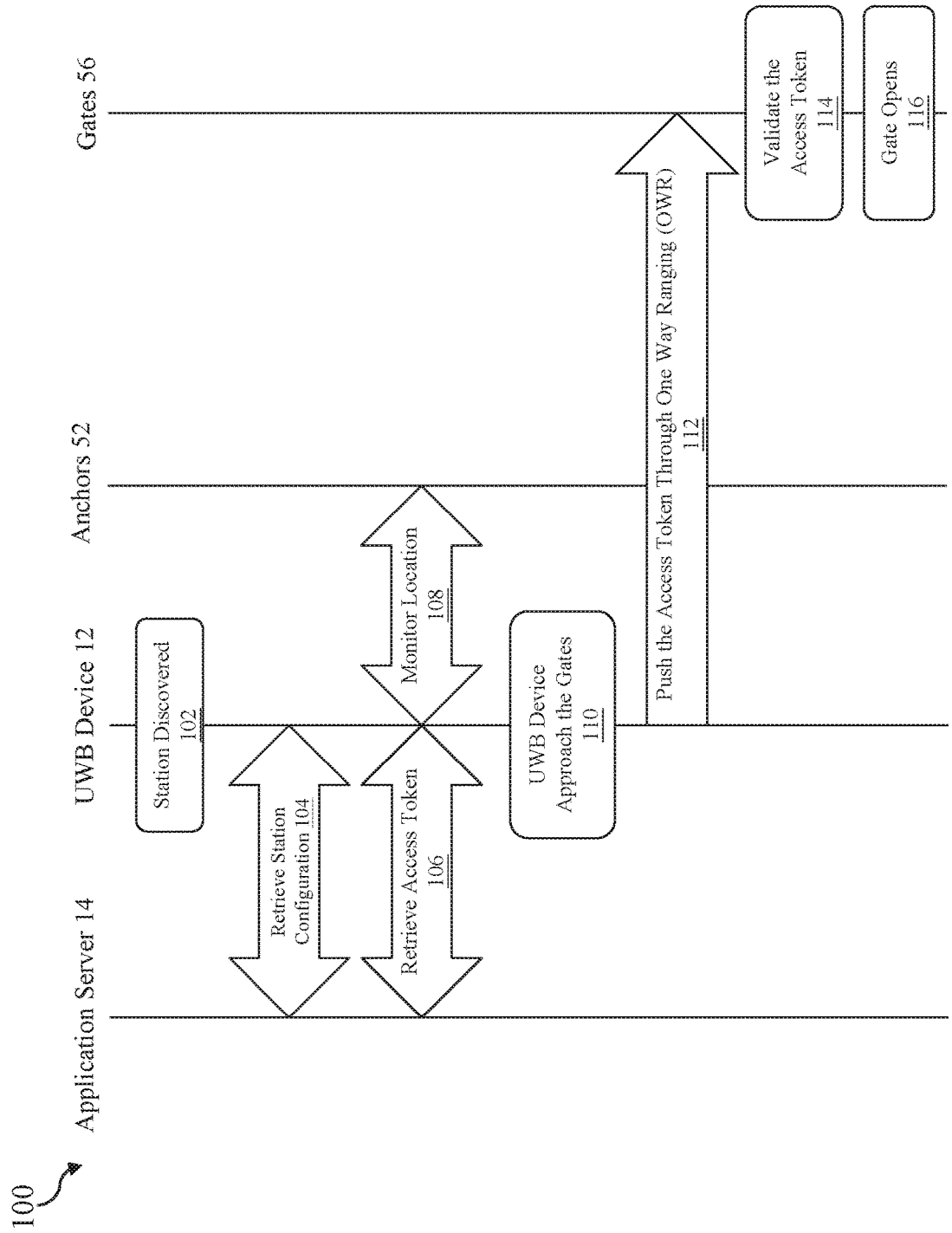
FIG. 3 illustrates a signaling diagram allowing a user to go through a gate according to some aspects of the present disclosure.

FIG. 3 shows an exemplary signaling diagram 100, which illustrates the procedure to allow a user carrying a UWB device 12 as set forth to go through a gate 56 according to some aspects of the present disclosure. At step 102, the UWB device 12 discovers that it has entered a transport station. For example, the UWB device 12 may receive a GPS signal through a GPS module integrated in the UWB device 12 and determine its location. In another example, the UWB device 12 may receive a beacon signal transmitted from a beacon device and become aware that it has passed the entrance of the transport station. At step 104, the UWB device 12 retrieves the station configuration from the application server 14. The station configuration may include parameters which are necessary for configuring subsequent communication steps. For example, the parameters may include PHY and MAC parameters to be used for the establishment of a UWB session when communicating with the gates 56. Once the UWB device 12 obtains the station configuration, the UWB device 12 then initiates in the background the following two steps. One is the step 106 to retrieve an access token, another is the step 108 to monitor its location within the station.

At the step 106, in order to obtain an access token from the application server 14, the UWB device 12 may need to authenticate with the application server 14 and complete the fare transaction with the application server 14. The application server 14 may exchange data messages with the UWB device 12 in order to perform authentication and to obtain the parameters required to establish a secure channel. Those data messages may be, for example, exchanged through a non-secure ranging session established by the application server 14. After a secure channel is established between the UWB device 12 and the application server 14, the fare collection transaction is performed by exchanging data messages over this secure channel. The data messages transmitted as part of this fare collection transaction may be similar or identical to those exchanged in current NFC-based transport systems. Once the authentication and fare transaction are successfully completed, the application server 14 generates an access token and sends it to the UWB device 12. At the step 106, the UWB device 12 may communicate with the application server 14 through a radio access technology available within the station instead of the UWB communication devices installed at the gates. The radio access technology may be Wi-Fi, Bluetooth, cellular connection technology, or other suitable wireless communication that is different from UWB communication. Alternatively, the radio access technology may be UWB communication, but not in proximity of the gates.

The access token may be encrypted by the application server 14 prior to being sent to the UWB device 12. In that case, the gates 56 shall be provisioned with the security material required to decrypt this access token.

An example of Access Token is shown below:

```
}
    "Id": ID_7214398,
    "ExpiryTime": "2024-04-23T18:25:43.511Z",
    "AllowedGates: ["Metro", "Tram"]
}
```

In this example, the access token is a JSON object containing the following three fields: a unique identifier, labeled as "Id"; an expiry time, labeled as "ExpiryTime", indicating the time until which this access token is valid; and a list, labeled as "AllowedGates", indicating what type of gates may accept this access token.

At the step 108, the UWB device 12 then monitors its location within the station by listening to the messages sent by the anchors 52. The anchors 52 are positioned at fixed locations in the transport station and may be time synchronized. The transport station may have at least three anchors 52 installed in the Zone II for implementing triangular positioning. In one example, the UWB device 12 monitors its location within the transport station by listening to the downlink time-difference-of-arrival (DL-TDoA) messages (e.g., Poll DTM, Final DTM) sent by the anchors 52. The DL-TDoA messages may be transmitted through a radio access technology based on Wi-Fi, Bluetooth, or cellular connection technology. In one alternative embodiment, the anchors 52 are UWB anchors, and the DL-TDoA messages are transmitted based on UWB communication. Once the UWB device 12 detects that its location is within a threshold range (e.g., a few meters) from one or several gates 56, the UWB device 12 proceeds to the step 112.

At the step 110, the UWB device 12 physically approaches the gates 56 while continues to monitor its location.

At the step 112, the UWB device 12 has determined that it is in proximity of the gates 56 and starts pushing the access token to the gates 56 through UWB, such as by sending transmission to UWB antennas installed at the gates. The details of the step 112 are further explained below with respect to FIG. 4.

At the step 114, after the access token is received by the UWB antennas, one of the gates 56 (or the gate controller 54) decrypts this access token and checks that its content is valid. This verification may include, for example, verifying that the current time is before the time indicated in the "ExpiryTime" field, and verifying that the type of the gate corresponds to one of the types indicated in the "Allowed-Gates" field.

At the step 116, the proper gate opens after the access token is validated.

Figure 4:
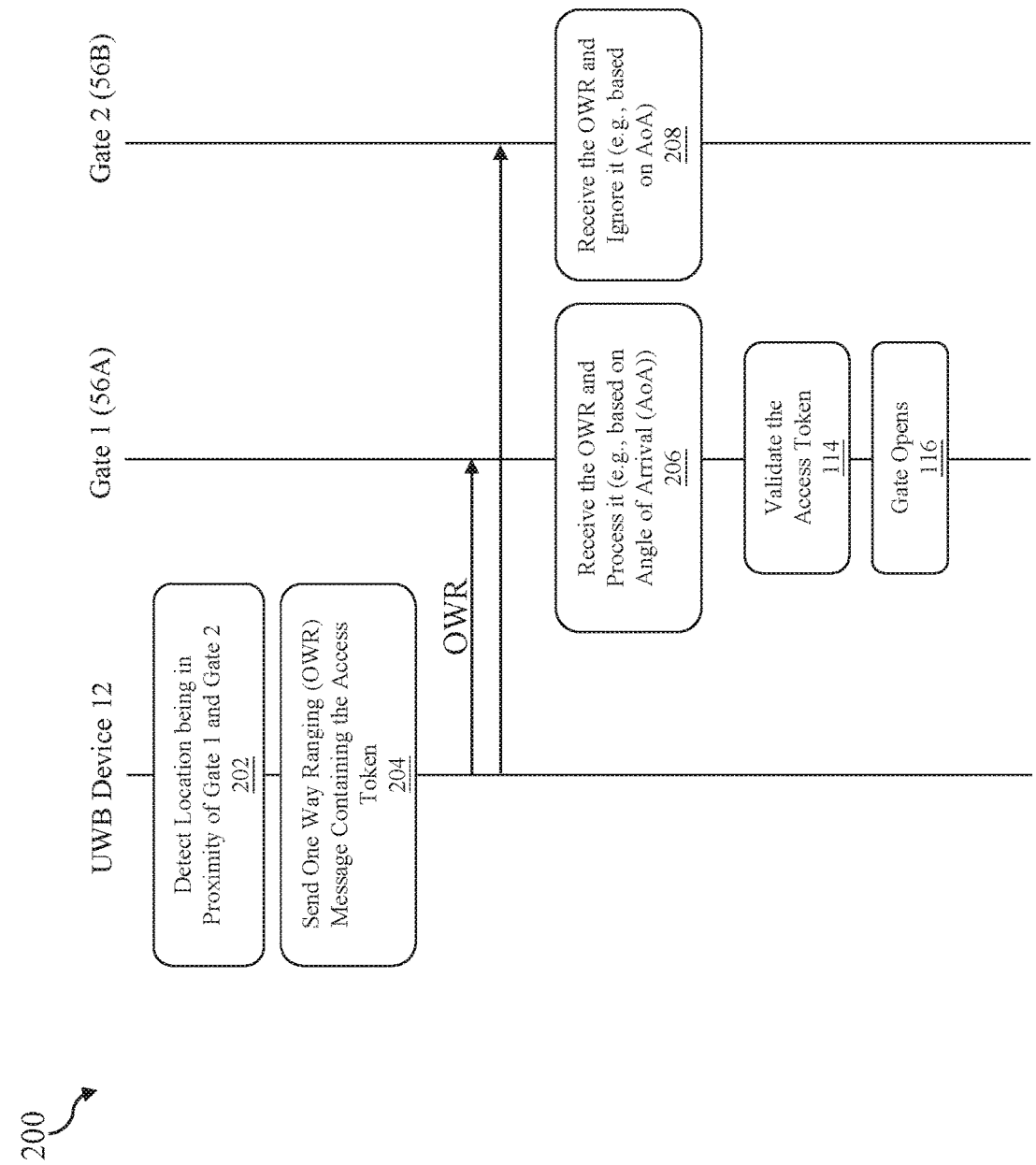
FIG. 4 illustrates a signaling diagram on how an access token is provided to a gate according to some aspects of the present disclosure.

FIG. 4 shows an exemplary signaling diagram 200, which is a portion of the signaling diagram 100 in FIG. 3. Particularly, the signaling diagram 200 illustrates the details of what occur between the steps 110 and 114 in the FIG. 3 regarding how the access token is provided to the gates 56 at the step 112. Two gates 56A and 56B as set forth in FIG. 2 are illustrated in FIG. 4 as gate 1 and gate 2 to facilitate the explanation.

At the step 202, the UWB device 12 detects that its location is in proximity of the gate 1 and gate 2, for example, in a range within a threshold range (e.g., one or a few meters).

At the step 204, in order to provide the access token to the gates, the UWB device 12 sends a One Way Ranging (OWR) message on UWB. The access token is included in a data message piggybacked with the OWR message. As an example, the OWR message may be constructed as specified in the FiRa specifications as defined by the FiRa. The OWR message may be broadcasted to all the gates, including the gate 1 and gate 2.

In order to receive the access token, each gate is equipped with one or more UWB antennas. The pattern of the UWB antennas installed at the gate, as well as the physical isolation of those antennas, may be designed in such a way that only OWR messages coming from a specific direction are received. In addition, when receiving the OWR message, each of the gates may determine the angle of arrival (AoA) associated with the OWR message, and may process the OWR message only if the AoA is within a predefined angular range, such as at the step 206, or may ignore the OWR message if the AoA is beyond a predefined angular range, such as at the step 208. Each of the gates may also communicate with a gate controller, such as the gate controller 54 as set forth in FIG. 2, in order to determine which gate is the proper gate (e.g., the gate 56A in FIG. 2) to open based on AoA information from multiple gates, and to invalidate an access token as soon as a gate opens, so that this token can no more be used to open a gate.

To improve reliability of the OWR message reception, in an alternative to sending the OWR message only once, the OWR message may be sent multiple times by the UWB device 12 at a pre-determined interval. Once the UWB device 12 has determined that it has passed through a gate, for example by continuing monitoring its location within the transport station, the UWB device 12 may stop sending the OWR messages.

Figure 5:
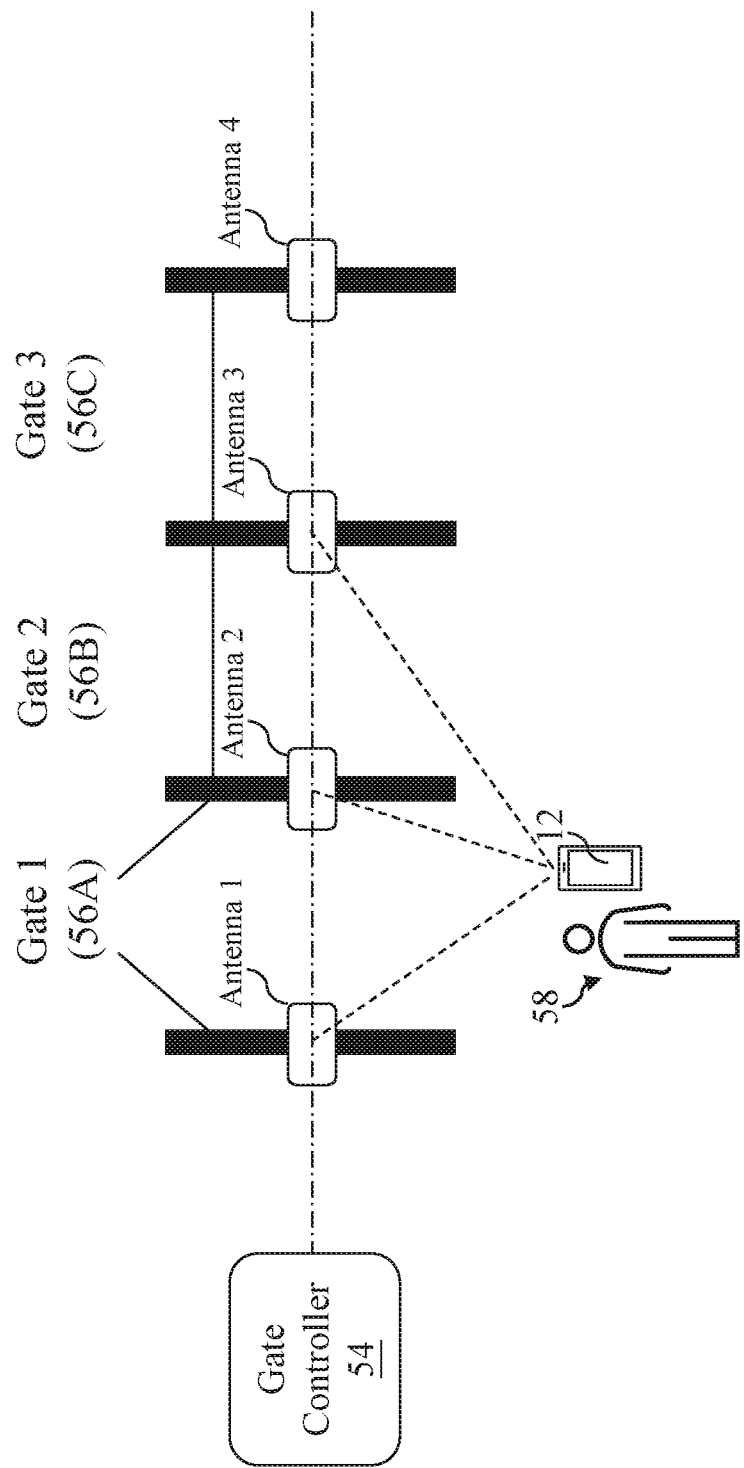
FIG. 5 illustrates an exemplary deployment of UWB antennas at a gate according to some aspects of the present disclosure.

FIG. 5 shows an example of the deployment of UWB antennas at the gates according to some aspects of the present disclosure. Alternatively, UWB antennas may be installed at the gates in other suitable manner. Three gates 56A, 56B, 56C as set forth in FIG. 2 are illustrated in FIG. 5 as gate 1, gate 2, gate 3 to facilitate the explanation. In the illustrated example, each gate has two UWB antennas installed on two sides of the respective gate. For example, the gate 1 is equipped with the UWB antennas 1 and 2, the gate 2 is equipped with the UWB antennas 2 and 3, and the gate 3 is equipped with the UWB antennas 3 and 4. The UWB antenna 2 is shared by the gates 1 and 2, and the UWB antenna 3 is shared by the gates 2 and 3. In furtherance of the example, the two UWB antennas associated with a gate are installed slightly ahead of the position of the gate, such as on two edges of a respective pass way leading to the gate.

The gate controller 54 may be connected to the UWB antennas 1 through 4, and able to configure the UWB operation at those antennas (e.g., provide UWB session configuration), as well as process the information that each UWB antenna receives through UWB. The gate controller 54 may also be able to send a command to open or close a gate 56.

According to the flow described in FIG. 4 and/or FIG. 5, the UWB device 12 detects that it is in proximity of the gates 56 and sends an OWR message containing the access token. In one particular example, this OWR message is received by the UWB antennas 1, 2, 3, as illustrated by the dashed lines. Each of the UWB antennas 1, 2, 3 determines the AoA of the received OWR message, with the assumed following values (assuming the value 0 degrees corresponds to the North direction (i.e., pointing to the top edge of the page) in the figure, and the angles are positive in the clockwise direction and negative in the counterclockwise direction):

AoA measured at the UWB antenna 1: 135 degrees
AoA measured at the UWB antenna 2: −130 degrees
AoA measured at the UWB antenna 3: −110 degrees When the UWB device 12 is in front a given gate, the AoA measured by the UWB antenna installed on the left side and on the right side of the gate shall have an opposite sign. This information may be used by the gate controller 54 to determine which gate to open. In this particular example, the AoA at the UWB antenna 1 and the UWB antenna 2 have an opposite sign. This means that the UWB device 12 is in front of the gate 1 and not in front of the gate 2. Therefore, after validating the access token provided within the OWR message, the gate controller 54 opens the gate 1.

Furthermore, the information on the angle measured at the UWB antennas installed on the left and on the right side of a gate, can be used to determine whether the user device 12 has crossed the line between the two UWB antennas. This crossing may then be used as a trigger to open the proper gate.

The condition to identify in front of which gate the user device 12 is located may be summarized as follows (assuming the antenna installed on the left side of a gate labeled as X is named "Antenna_Left_Gate_X", and the antenna installed on the right side of the gate X is named "Antenna_Right_Gate_X"):

If ((AoA at Antenna_Left_Gate_X>90) and (AoA at Antenna_Right_Gate_X<−90)):
  User is in front of Gate X and before the line between the two antennas
If ((AoA at Antenna_Left_Gate_X<90) and (AoA at Antenna_Right_Gate_X>−90)):
  User is in front of Gate X and beyond the line between the two antennas.

In addition, when the information on the distance between the UWB device 12 and each UWB antenna is available (such as in the alternative UWB communication based on secure ranging described below with respect to FIG. 6), this information may be used to further increase the reliability of gate selection and line crossing detection, as the distance between the UWB device 12 and each of the UWB antennas associated with a given gate shall decrease as the user approaches this gate.

Figure 6:
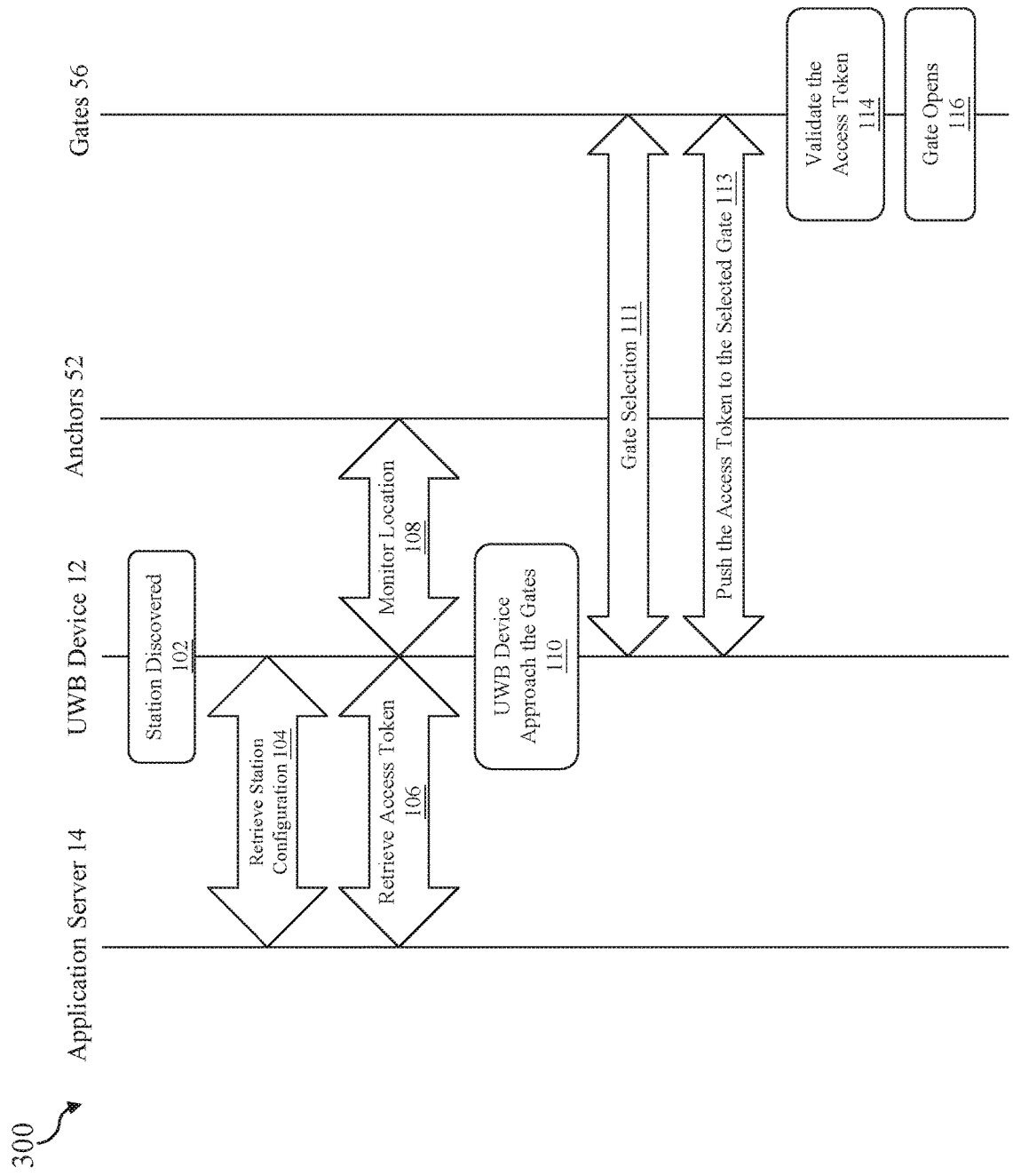
FIG. 6 illustrates an alternative signaling diagram allowing a user to go through a gate according to some aspects of the present disclosure.

FIG. 6 shows an alternative signaling diagram 300, which illustrates the procedure to allow a user carrying a UWB device 12 as set forth to go through a gate 56 according to some aspects of the present disclosure. The signaling diagram 300 is similar to the signaling diagram 100 in FIG. 3, particularly in steps 102, 104, 106, 108, 110, 114, and 116. One difference is that instead of sending the access token within an OWR message, the access token may be delivered to the gate during a secure ranging session. In this alternative, each gate may execute a hybrid UWB session configured with two secondary sessions. One is the step 111, in which a contention access period (CAP) session is used by the gates to determine which UWB devices may participate to the secure ranging session. Another is the step 113, in which the secure ranging session is used to transmit the access token to the selected gate.

FIGS. 7A, 7B, 7C illustrate a signaling diagram 400, which is a portion of the alternative signaling diagram 300 in FIG. 6. Particularly, the signaling diagram 400 illustrates the details of what occurs at the steps 111 and 113 in the alternative signaling diagram 300.

Reference is now made to FIG. 7A. At the step 402, the UWB device 12 detects that its location is in proximity of a gate, for example, the gate 1. At the step 404, after the UWB device 12 detects that it is in proximity of the gate 1, the UWB device 12 starts participating the contention-based session associated with the gate 1. At the step 406, the UWB device 12 selects a random slot within the CAP indicated by the gate 1 in a ranging initiation message (RIM) and transmits a ranging response message (RRM) within this slot. At the step 408, the gate 1 evaluates the distance D with each UWB device that sends the RRM during the CAP, which is the UWB device 12 in the illustrated example. At the step 410, when the gate 1 determines that the UWB device 12 is sufficiently close (e.g., the evaluated distance D is below a pre-defined value denoted as Threshold_1), the gate 1 stores the MAC address of the UWB device 12 and performs secure ranging (either single-sided two-way ranging (SS-TWR) or double-sided two-way ranging (DS-TWR)) with the UWB device 12. At the step 412, the gate 1 includes the MAC address of the UWB device 12 in the field "Destination Address" of the RIM at the beginning of the secure ranging session.

Reference is now made to FIG. 7B, which illustrates an SS-TWR process. The signaling diagram 400 in FIG. 7A continues to the step 414 in FIG. 7B, in which the UWB device 12 replies to the RIM with an RRM including the access token. At the step 416, upon receiving the RRM, the gate 1 evaluates the distance D in order to verify that the UWB device 12 is near enough to cross the gate 1 (e.g., the evaluated distance D is lower than a predefined value denoted as Threshold_2 with Threshold_2<Threshold_1). If this is the case, the gate validates the content of the access token at the step 418 and opens at the step 420.

Reference is now made to FIG. 7C, which illustrates a DS-TWR process. One difference between the flows in FIG. 7B and FIG. 7C is that in FIG. 7B the distance to the gate is evaluated by the gate, while in FIG. 7C when DS-TWR is used, the distance to the gate may be evaluated by the UWB device (as shown in the step 417 in FIG. 7C), and provided to the gate in a ranging result report message (RRRM). Particularly, the signaling diagram 400 in FIG. 7A continues to the step 414 in FIG. 7C, in which the UWB device 12 replies to the RIM with an RRM including the access token. At the step 417, upon receiving a ranging final message (RFM), the UWB device 12 evaluates the distance D and provides the evaluated distance D to the gate 1 in the RRRM. At the step 418, upon receiving the RRRM, the gate 1 is informed that the UWB device 12 is near enough to cross the gate 1 (e.g., the evaluated distance D is lower than a predefined value denoted as Threshold_2 with Threshold_2<Threshold_1) and validates the content of the access token. At the step 420, the gate 1 opens.

As discussed above, the secure ranging session may be based on DS-TWR or SS-TWR. Once the procedure described in FIG. 7B or in FIG. 7C is completed, the gate may further indicate to the UWB device that the gate has been opened, for example by sending a Control Message with "Stop Ranging" bit set to 1 in the next ranging round.

The parameters of the secure ranging session (e.g., the UWB Session Key and the UWB Session ID) associated with each gate may be downloaded by the UWB device during the step 104 in FIG. 6, in which the station configuration is retrieved by the UWB device. Notably, the gate may use a different pre-defined set of parameters for the secure ranging session throughout the day (for example, this set of parameters may change every 30 minutes). In that alternative, the UWB device may download those pre-defined sets of parameters together with their associated validity period during the step 104 in FIG. 6. Thus, when arriving in proximity of a gate, the UWB device determines which set of parameters to use in order to participate to the secure ranging session associated with this gate, according to the current time.

FIG. 8 shows an alternative signaling diagram 500, which illustrates the procedure to allow a user carrying a UWB device 12 as set forth to go through a gate 56 according to some aspects of the present disclosure. The signaling diagram 500 is similar to the signaling diagram 100 in FIG. 3, particularly in steps 102, 104, 108, 110, 112, and 116. One difference is that a list of access tokens may be pre-loaded in advance within the UWB device 12 at the step 101 prior to the UWB device 12 entering the transport station, for example following a purchase by the user. When receiving this access token, the proper gate 56 may interact with the application server 14 at the step 114 in order to verify that this access token is valid and has not already been used. At the step 116, the proper gate opens after the access token is validated. Notable, the pre-loaded access tokens may be different from the access token provided by the UWB device 12 to the gates 56. In that case, as soon as the station is discovered at the step 102, the UWB device 12 may request the application server 14 to convert the pre-loaded access token into an access token acceptable by the gates 56 of this transport station.

FIG. 9 illustrates an exemplary architecture of the UWB device 12. As discussed above with respect to FIG. 1, the UWB device 12 includes a transportation application 18 as one of the mobile applications installed in the UWB device 12. The transportation application 18 includes a module 18A for discovery and configuration, a module 18B for access token retrieval, a module 18C for location tracking, and a module 18D for access token push. The UWB device 12 further includes a wireless interface 26 to facilitate wireless communication with an application server 14 via wireless links. The transportation application 18 may utilize the wireless interface 26 as needed. The wireless interface 26 may represent a hybrid wireless communication approach that combines UWB communication and one or more wireless communications other than UWB (e.g., Bluetooth, GPS, Wi-Fi, and cellular data connection). For example, the module 18A and the module 18B may utilize the cellular data connection, such as 5G data connection, in the wireless interface 26 for retrieving the station configuration and retrieving the access token from the application server; while the module 18C and the module 18D may utilize a UWB chip in the wireless interface 26 for location tracking (e.g., to receive DL-TDoA messages) and access token transmission. The UWB device 12 also includes a storage 28. The storage 28 stores program instructions, which, when executed by a processor of the UWB device 12 causes the UWB device 12 to run the transportation application 18 according to the flows illustrated in the signaling diagrams discussed above. The storage 28 also stores station configuration retrieved from the application server and access token retrieved from the application server.

Those skilled in the art will recognize improvements and modifications to the preferred embodiments of the present disclosure. All such improvements and modifications are considered within the scope of the concepts disclosed herein and the claims that follow.

What is claimed is:

1. A method for operating an ultra-wideband (UWB) device, comprising:
   detecting, in a first zone, the UWB device entering an access-controlled area, wherein the access-controlled area includes a gate configured to perform a UWB communication;
   retrieving, in a second zone, an access token from an application server of the access-controlled area through a wireless communication other than the UWB communication prior to the UWB device entering a predetermined range of the gate; and
   transmitting, in a third zone, the access token to the gate through the UWB communication after the UWB device entering the predetermined range of the gate and moving towards a fourth zone, wherein:
   the first zone, the second zone, the third zone, and the fourth zone are arranged in a sequence, and
   the first zone, the second zone, and the third zone are on one side of the gate, and the fourth zone is on another side of the gate.

2. The method of claim 1, further comprising:
   retrieving a communication configuration from the application server of the access-controlled area, wherein the communication configuration includes parameters for configuring the UWB communication and the wireless communication other than the UWB communication, respectively.

3. The method of claim 1, wherein the detecting the UWB device entering the access-controlled area is through a Global Positioning System (GPS) module of the UWB device.

4. The method of claim 1, wherein the detecting the UWB device entering the access-controlled area is through receiving a beacon signal from the access-controlled area.

5. The method of claim 1, wherein the access-controlled area is a transport station.

6. The method of claim 1, further comprising:
   monitoring location of the UWB device in the access-controlled area by communicating with a plurality of anchor devices located in the access-controlled area, wherein the transmitting the access token is triggered by the monitored location being within the predetermined range of the gate.

7. The method of claim 6, wherein the plurality of anchor devices are UWB anchor devices.

8. The method of claim 1, wherein the retrieving the access token includes authenticating the UWB device and finalizing a financial transaction through the wireless communication other than the UWB communication.

9. The method of claim 1, wherein the transmitting the access token is through transmitting a One Way Ranging (OWR) message carrying the access token.

10. The method of claim 9, wherein the gate is configured to:
    detect an angle of arrival (AoA) of the OWR message, and
    validate or ignore the access token based on the detected AoA.

11. The method of claim 1, wherein the transmitting the access token is through a Two Way Ranging (TWR) communication between the UWB device and the gate.

12. A method for operating an access control system having a gate configured to perform an ultra-wideband (UWB) communication, comprising:
    acquiring information of arrival of a UWB device;
    sending, in a first zone, communication configuration to the UWB device, wherein the communication configuration includes parameters for configuring the UWB communication and a wireless communication other than the UWB communication;
    sending, in a second zone, an access token to the UWB device through the wireless communication other than the UWB communication;
    receiving, in a third zone, by the gate the access token transmitted by the UWB device through the UWB communication;
    validating by the gate the access token; and
    opening the gate to pass through the UWB device towards a fourth zone, wherein:
    the first zone, the second zone, the third zone, and the fourth zone arranged in sequence, and
    the first zone, the second zone, and the third zone are on one side of the gate, and the fourth zone is on another side of the gate.

13. The method of claim 12, further comprising:
    tracking location of the UWB device through a plurality of anchor devices of the access control system.

14. The method of claim 13, wherein the sending the access token to the UWB device occurs during the UWB device is tracked by the plurality of anchor devices.

15. The method of claim 12, further comprising:
    after the receiving of the access token, determining an angle of arrival (AoA) of a message carrying the access token, wherein the validating the access token is triggered by the determined AoA.

16. The method of claim 12, further comprising:
    after the receiving of the access token, evaluating a distance between the gate and the UWB device through a Two Way Ranging (TWR) communication, wherein the validating the access token is triggered by the distance being less than a threshold.

17. An ultra-wideband (UWB) device, comprising:
    a transceiver operable to perform a UWB communication and a wireless communication other than the UWB communication;
    a memory for storing program instructions, a configuration of an access-controlled area, and an access token to access a gate of the access-controlled area; and
    a processor coupled to the transceiver and to the memory, wherein the processor is operable to execute the program instructions, which, when executed by the processor, cause the UWB device to perform the following to facilitate hands-free fare validation when a user carrying the UWB device enters the access-controlled area:
    receive, in a first zone, the configuration of the access-controlled area,
    receive, in a second zone, the access token from an application server of the access-controlled area through the wireless communication other than the UWB communication, and based on a location tracked by a plurality of anchor devices in the access-controlled area, transmit, in a third zone, the access token to the gate of the access-controlled area through the UWB communication as the transceiver is moving towards a fourth zone, wherein;

parameters of the UWB communication are configured by the received configuration of the access-controlled area, the first zone, the second zone, the third zone, and the fourth zone arranged in sequence, and the first zone, the second zone, and the third zone are on one side of the gate, and the fourth zone is on another side of the gate.

18. The UWB device of claim 17, wherein the wireless communication other than the UWB communication is one of Wi-Fi, Bluetooth, or cellular data.

19. The UWB device of claim 17, wherein the memory is operable to store a pre-loaded access token prior to the user entering the access-controlled area, and wherein the pre-loaded access token is converted to the access token by the application server of the access-controlled area.

20. The UWB device of claim 17, wherein the access-controlled area is a transport station.

* * * * *